Nov. 28, 1933.        M. L. HANAHAN        1,937,037
PROCESS OF MAKING TITANIUM OXIDE OF FINE TEXTURE
Original Filed Aug. 7, 1931
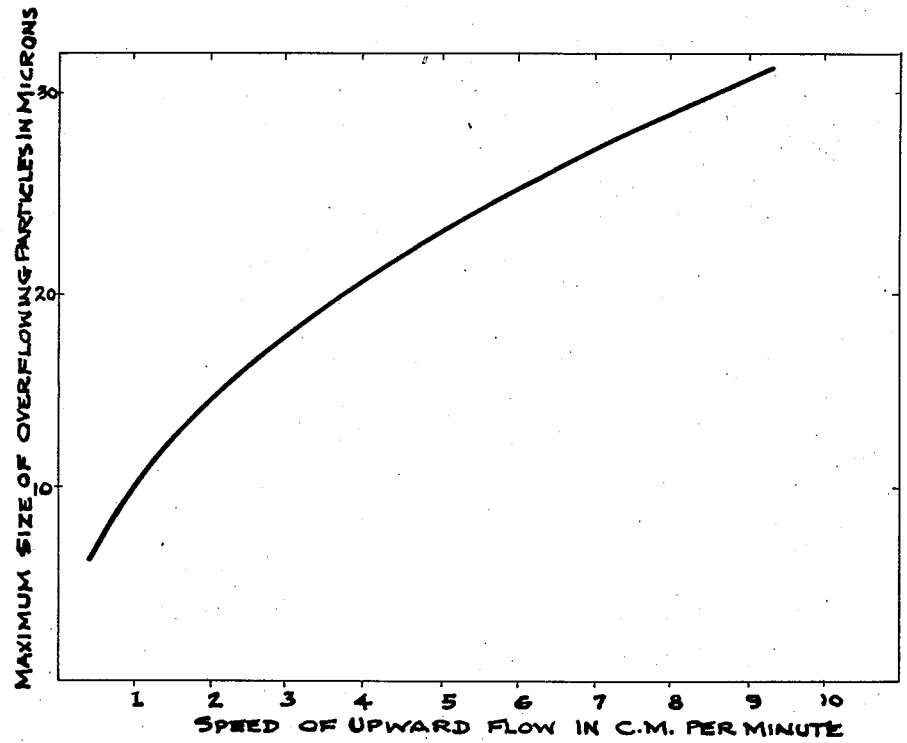
INVENTOR.
MARION L. HANAHAN
BY
ATTORNEY.

Patented Nov. 28, 1933

1,937,037

UNITED STATES PATENT OFFICE 1,937,037

PROCESS OF MAKING TITANIUM OXIDE OF FINE TEXTURE

Marion L. Hanahan, East Orange, N. J., assignor to Krebs Pigment & Color Corporation, Newport, Del., a corporation of Delaware Original application August 7, 1931, Serial No. 555,770. Divided and this application June 16, 1932. Serial No. 617,577

13 Claims. (Cl. 23—202)

This invention relates to titanium oxide pigments free from gritty or abnormally large particles, such as will affect the texture and uniformity of a paint film and to the production of such pigments, more particularly to the removal of particles of the order of 6 microns and larger from a water suspension of calcined titanium oxide.

Titanium oxide pigments are usually produced by calcination or other heat treatments of a precipitated titanium compound, such as, for instance, titanium hydroxide obtained by hydrolysis of a titanium sulfate solution. As is well known in this art, such heat treated titanium oxides contain particles or aggregates which prevent the formation of a smooth, unbroken and glossy film of paint when made from such a product. This property of such pigments is a direct result of the conditions obtaining in their methods of manufacture. The precipitation step tends to form aggregates of fine particles and the subsequent heat treatments, such as drying and calcination, cement these aggregates by compacting and sintering. These aggregates are to a certain extent disintegrated and their number reduced by the commonly used grinding processes, such as passages through pebble or colloid mills. These grinding operations act also upon unaggregated particles, reducing their size to an undesirable fineness, and due to this and the inherent hardness of the titanium oxide aggregates it has up to the present been practically impossible to completely eliminate or reduce the relatively large size aggregates contained in heat treated titanium oxide pigments.

It must be realized that screening can not achieve the elimination of large particles which are visible to the naked eye when contained in paint films. The finest screen which can be used technically for such operations is 325 mesh. The openings of such screens are large enough to allow the passage of particles of about 40 microns, which is way above the limit of visibility. Particles of about 15 microns size are easily detected by the unaided eye in paint films, and with special precautions and careful lighting an ordinary eye can even detect in a paint film particles of about 6 to 8 microns.

It was also found that simple washing and decantation of calcined titanium oxide does not allow of a separation into fractions of different particle sizes.

I have found that the large particles or aggregates contained in calcined titanium oxide can be separated from the smaller particles by a deflocculation process followed by elutriation, whereby the fraction of smaller particles will produce when ground in oil a paint giving smooth, unbroken and glossy films, and my invention consists in deflocculating calcined titanium oxide in suspension of a liquid and elutriating such deflocculated suspensions, whereby on regulating the rate of flow any desired separation is obtained.

The deflocculation of the calcined titanium oxide is an essential step in my process. Ordinary aqueous suspensions of calcined titanium oxide do not shown any material separation of small from large particles in an elutriation process. The deflocculation must be closely controlled and I found that the alkalinity of the slurry should be above a pH of 7.2 and preferably between about 8 and 10; substantially above 10 the pigment will not be deflocculated to the extent at which a good separation by elutriation can be obtained.

Of great importance is also the deflocculating agent used. Alkaline earth metal hydroxides, including magnesium hydroxide, do not produce deflocculation even at the above pH values. On the contrary, they rather tend to flocculate or aggregate the particles of calcined titanium oxide and may even be used for recovering the deflocculated pigment from its suspensions. Alkaline reacting alkali metal compounds, which term is meant to include ammonium compounds, are the most effective agents I have found to defloccuate calcined titanium oxide for elutriation purposes. Sodium hydroxide, sodium carbonate, sodium silicate, trisodium phosphate and aqua ammonia are the commonest and best available agents for use in my novel process. Acid agents, which are so powerful for dispersing uncalcined titanium oxide, are entirely useless on the calcined pigment.

The rate of deflocculation or dispersion of the pigment slurry can easily be determined by observation of the settling of a diluted pigment slurry. A deflocculation perfectly suited for use in my process is obtained when a 1:7 slurry does not show any settling on standing for from 10 minutes to ½ hour and no flocculates are visible in the slurry. Such a state of dispersion is, for instance, produced by adding 0.11% NaOH (based on the weight of the pigment) to a neutral suspension of calcined titanium oxide, in which case a pH of 9.6 is obtained.

The following table shows optimum amounts of various agents for deflocculating calcined titantium oxide pigment slurries for use in my process:

| Agent used | Percent agent based on weight of pigment | Conc. of slurry, about | pH of slurry |
|---|---|---|---|
| Sodium silicate | 2.38 | 1:7.5 | 9.6 |
| NaOH | .11 | 1:6.8 | 10.0 |
| NH₄OH | 9.5 | 1:8.7 | 9.6 |
| Na₃PO₄.12H₂O | .71 | 1:6.9 | 9.2 |
| Na₂CO₃ | .18 | 1:6.8 | 8.0 |

Lesser and larger amounts than those given in the above table can be used to produce a deflocculated suspension of calcined titanium oxide useful in the subsequent steps of my process, provided the pH of the suspension is kept within the limit from about 7.2 to not substantially exceeding 10. 0.43% tri-sodium phosphate hydrate serves to disperse the titanium oxide very well and this amount can be used to good advantage in the subsequent elutriation step.

Soda ash disperses already at a rate of 0.14% and the dispersion remains practically unchanged within the range of 0.14 to 0.42%. Caustic soda disperses perfectly at 0.11%, but half of this amount (0.055%) will yield a fair dispersion, though flocs are evident. These settle out from the suspension, but the remainder will remain perfectly suspended for more than 12 hours.

The second step in my novel process of producing improved titanium oxide pigments consists in elutriating the deflocculated pigment suspension. This operation consists in causing the suspension to flow upwardly through a vessel at a predetermined rate; the heavier, larger particles settle out against the flow of the liquid and fall to the bottom of the vessel, the smaller particles being entrained and overflow with the liquid. Convenient types of elutriating vessels are, for instance, the so-called Dorr hydro-separator, which in its essential parts consists of a cylindrical tank, with revolving rake, central submerged feed and overflow. Other forms of sedimentation equipment, such as the Callow cone or simple rectangular vats, are suitable for performance of my process, but as they are well known, particularly in the mining art, they do not need to be discussed herein in detail.

The attached figure gives a graphical representation of the relationship between speed of upward flow of a well deflocculated aqueous suspension of calcined titanium oxide and the size of the largest particles which are entrained in the overflowing liquid. Particles of larger size will at the given speed be retained in the elutriating vessel and fall to the bottom. The horizontal axis in this figure gives the speed of upward flow in centimeters per minute and the vertical axis gives the particle size of the largest entrained particles in microns. It will be seen from this figure that particles of 15 microns will be entrained when the speed exceeds 2 cm/min. with increasingly larger particles overflowing at greater speeds. To obtain an overflow which consists of particles less than the extreme visibility, that is to say 6 microns, the elutriation speed has to be reduced to less than ½ cm/min., for instance, about ⅓ cm/min.

The figures of the above table correspond to elutriation at ordinary, room temperature, about 15 to 25° C. It will be understood that at higher temperatures slightly greater speeds will produce the same separations.

By elutriating a well deflocculated suspension of calcined titanium oxide at, for instance, a speed not exceeding 2 cm/min. as described above, I obtain a fractionation of the crude pigment into two parts: One contained in the overflow and one remaining as a sediment in the elutriating vessel. This sediment consists in its majority of titanium oxide particles or aggregates of a size of about 15 microns and larger. It constituted in one operation conducted on a normal, commercial calcined titanium oxide pigment 38% of the total pigment treated. This product is preferably reground as in a pebble mill and rendered available by again submitting it to deflocculation and elutriation.

The overflow fraction constitutes a dispersed suspension of TiO₂ particles having substantially all a particle size less than 15 microns. On long standing this suspension will separate into a thick slurry of the pigment and a clear water layer. This separation can be speeded up by acidifying the suspension to a pH of below 6.5, preferably to about 4, whereby the suspension is broken and the pigment settles quickly and is then recovered and finished in the usual manner of preparing pigments for paint purposes.

The dilution of the deflocculated TiO₂ suspension has no very material effect upon the efficiency of my process, though it will be necessary to use a well fluid suspension, such as one which contains 1 part by weight of pigment to about 7 parts of water, but suspensions of greater dilution, such as 1 : 12 or 1 : 20 will give likewise a clear cut separation and the rate of dilution will more or less be determined by economical consideration.

In a practical embodiment of my invention I prepare, for instance, a slurry of 20 tons of calcined titanium oxide in 240 tons of water and deflocculate this suspension with the requisite amount of caustic soda. This suspension is then continuously fed over a period of about 24 hours into an elutriation tank of circular shape, having an effective settling area of 175 sq. ft. and a depth of 9 ft. A normal temperature of 15–25° C. is suitable, although the capacity of the equipment may be increased by the use of a somewhat higher temperature. The overflow from this tank is then conducted to a smaller, receiving tank, to which sulfuric acid is added to acidify the suspension to a pH of about 4. The acidified suspension is then passed to a second settling tank similar in dimensions to the elutriation tank. The pigment settles rapidly therein and is thickened to a ratio of 2 parts water to 1 of titanium oxide. The speed of upward flow in the elutriating vessel under the above conditions is less than about 1.5 cm. per minute. This insures a complete separation between particles of 13 to 15 microns and larger which will be found as a sediment in the elutriation tank, and the smaller particles which are recovered as a thick slurry. This slurry is filter-pressed, washed, dried and after crushing to break up lumps formed on drying, the pigment is ready for use. This pigment consists substantially entirely of particles smaller than 15 microns. When made up into a paint, the paint forms films of smooth, unbroken and glossy surface, without any irregularities visible with the naked eye. In this respect the paint films differ materially from the mat, speckly films obtained with the non-elutriated pigment.

By decreasing the upward flow of the suspension to about ½ cm/min. a still finer pigment is obtained which contains particles of less than 8 microns only, and the pigment recovered from such operations produces a smooth, glossy paint film eminently suited for high grade enamel finish, or for compounding in rubber.

A further reduction in speed to about ⅓ cm/min. eliminates particles down to about 6 microns and the pigment obtained under such conditions produces paint films of a perfect mirror-like appearance.

I have in the above described my invention in connection with the separation of the titanium oxide pigment into 2 fractions only. It should be understood that I can also operate by having the deflocculated pigment suspension pass through several elutriating vessels at decreasing speeds of flow, whereby the largest particles are eliminated in the first step with particles of intermediate sizes obtained in one or more subsequent elutriations, from which they are recovered for various possible purposes, the final elutriation resulting in an overflow of extremely small and uniform particles.

The process is also applicable to composite titanium oxide pigments, such as mixtures of $TiO_2$ with sulfate extenders or zinc oxide, etc.

The great practical advantage of my invention consists in the possibility of producing titanium oxide pigments of any desired texture and particularly in pigments of extremely fine texture, which it has heretofore been impossible to produce with calcined titanium oxide.

The laboratory tests for fineness of texture available at the present time are all of a comparative nature against other pigments, such as, for instance, zinc oxide, which, by its nature, can be produced substantially free from large particles which interfere with the smoothness of paint films made therefrom. While such tests are not strictly quantitative, visual inspection of films made from a series of different pigments allows of an easy classification of the pigments into two groups: those which contain particles visible to the naked eye, which means that the films contain more or less dots or small irregularities, showing therefor a mat and speckled surface, and those which are free from particles visible to the naked eye, which produce paint films substantially free from irregularities and speckles, the films being smooth and glossy, and even mirror-like when such particles are also removed which are only visible under certain precautions. The transition from a mat and speckled film to a glossy, smooth film takes place when the pigments contain no particles of about 15 microns and larger. A further improvement in the texture of the titanium oxide pigment is obtained when the particles of a size from 15 to about 8 microns are removed and the perfect mirror-like finishes are obtained with titanium oxide pigments which consist of particles which are substantially all of a size less than 6 microns.

This is a division of my application Ser. No. 555,770 filed Aug. 7, 1931.

I claim:

1. The process of separating a calcined titanium oxide pigment into fractions of different particle size which comprises deflocculating a suspension of said pigment in a liquid, elutriating said deflocculated suspension at a predetermined speed of flow and separately recovering the pigment which settles out against the flow in the elutriator and the pigment contained in the overflow from the elutriator.

2. The process of separating a calcined titanium oxide pigment into fractions of different particle size which comprises deflocculating an aqueous suspension of said pigment by means of an alkaline reacting alkali-metal compound and adjusting the pH of said suspension to between about 7.2 and 10, elutriating said deflocculated suspension at a predetermined rate of flow and separately recovering the pigment which settles out against the flow in the elutriator and the pigment contained in the overflow from the elutriator.

3. The process of claim 2 in which the recovery of the pigment contained in the overflow involves acidification of the overflow suspension.

4. The process of separating heat treated titanium oxide into fractions of different particle size which comprises suspending the titanium oxide in water at a ratio of not more than about 1 part titanium oxide in 7 parts of water, adding an alkaline reacting alkali-metal compound to the suspension in an amount sufficient to produce a pH of between 7.2 and about 10, whereby a deflocculated suspension is obtained, elutriating said deflocculated suspension at a rate of upward flow of less than 2 cm/minute at ordinary temperature and recovering the pigment contained in the overflow of the elutriator.

5. The process of claim 4 in which the rate of upward flow is less than about ½ cm/minute.

6. The process of deflocculating a heat treated titanium oxide pigment which comprises suspending said pigment in water at a concentration of not more than about 1 part of titanium oxide to 7 parts of water, agitating said suspension and imparting to it a pH of between 7.2 and about 10 by the addition thereto of an alkaline reacting alkali-metal compound.

7. The process of deflocculating a heat treated titanium oxide pigment which comprises suspending said pigment in water and adding to said suspension an amount of caustic alkali producing in the suspension a pH of between 7.2 and about 10.

8. The process of deflocculating a heat treated titanium oxide pigment which comprises suspending said pigment in water and adding to said suspension an amount of sodium silicate producing in the suspension a pH of between 7.2 and about 10.

9. The process of deflocculating a heat treated titanium oxide pigment which comprises suspending said pigment in water and adding to said suspension an amount of tri-sodium phosphate producing in the suspension a pH of between 7.2 and about 10.

10. In a process for separating a calcined titanium oxide pigment into fractions of particles of different size, the steps of preliminarily determining the amount of deflocculating agent, the concentration of pigment suspension and the pH value thereof in respect to each other which produce a deflocculation of said pigment, deflocculating said pigment under the conditions as determined, and elutriating said deflocculated suspension.

11. In a process for separating a calcined titanium oxide pigment into fractions of particles of different size, the steps of preliminarily determining the amount of deflocculating agent, the concentration of pigment suspension and the pH value thereof in respect to each other which produce a deflocculation of said pigment so that said suspension shows no substantial settling on standing for from 10 minutes to ½ hour and no flocculates are visible in the suspension, deflocculating said pigment under the conditions as determined, elutriating said deflocculated suspension, and separately recovering the pigment which settles out against the flow in the elutriator and the pigment contained in the overflow from the elutriator.

12. In a process for separating a calcined titanium oxide pigment into fractions of particles of different size, the steps of preliminarily determining the amount of alkaline deflocculating agent, the concentration of pigment suspension and the alkalinity thereof in respect to each other which produce a deflocculation of said pigment, deflocculating said pigment under the conditions as determined, and elutriating said deflocculated suspension.

13. The process of deflocculating a heat treated titanium oxide pigment which comprises suspending said pigment in water and agitating that pigment in the presence of an alkaline reacting alkali metal compound.

MARION L. HANAHAN.